United States Patent
Shu

(10) Patent No.: US 8,583,921 B1
(45) Date of Patent: Nov. 12, 2013

(54) METHOD AND SYSTEM FOR IDENTITY AUTHENTICATION

(76) Inventor: Lingyan Shu, Metairie, LA (US)

( * ) Notice: Subject to any disclaimer, the term of this patent is extended or adjusted under 35 U.S.C. 154(b) by 1239 days.

(21) Appl. No.: 11/173,872

(22) Filed: Jun. 30, 2005

Related U.S. Application Data

(60) Provisional application No. 60/583,978, filed on Jun. 30, 2004.

(51) Int. Cl.
*H04L 9/32* (2006.01)

(52) U.S. Cl.
USPC .............................. 713/168; 713/170; 713/172

(58) Field of Classification Search
USPC .......................................... 713/168, 170, 172
See application file for complete search history.

(56) References Cited

U.S. PATENT DOCUMENTS

| | | | |
|---|---|---|---|
| 5,319,711 A * | 6/1994 | Servi | 380/247 |
| 5,705,993 A | 1/1998 | Alesu | |
| 6,189,096 B1 | 2/2001 | Haverty | |
| 6,230,266 B1 | 5/2001 | Perlman et al. | |
| 6,301,658 B1 | 10/2001 | Koehler | |
| 6,766,453 B1 | 7/2004 | Nessett et al. | |
| 6,795,919 B1 | 9/2004 | Gibbs et al. | |
| 6,836,765 B1 * | 12/2004 | Sussman | 705/75 |
| 6,851,054 B2 | 2/2005 | Wheeler et al. | |
| 6,950,940 B2 | 9/2005 | Wheeler et al. | |
| 7,100,049 B2 * | 8/2006 | Gasparini et al. | 713/170 |
| 7,320,073 B2 * | 1/2008 | Zissimopoulos et al. | 713/179 |
| 2003/0110399 A1 * | 6/2003 | Rail | 713/202 |
| 2003/0126431 A1 * | 7/2003 | Beattie et al. | 713/156 |
| 2005/0074126 A1 * | 4/2005 | Stanko | 380/279 |

OTHER PUBLICATIONS

Menezes et al. "Handbook of Applied Cryptography" © 1997 CRC Press LLC. (780 pages).*
B. Ramsdell. "RFC 2633: S/MIME Version 3 Message Specification" Published Jun. 1999 (32 pages) http://www.faqs.org/ftp/rfc/pdf/rfc2633.txt.pdf.*
T. Dierks et al. "RFC 2246: The TLS Protocol Version 1.0" Published Jan. 1999 (81 pages) http://www.faqs.org/ftp/rfc/pdf/rfc2246.txt.pdf.*
Wikipedia article for "Transport Layer Security", originally published Jun. 26, 2004 (1 page) http://en.wikipedia.org/w/index.php?title=Transport_Layer_Security&oldid=4385446 &printable=yes.*
T. Dierks et al. RFC 2246: The TLS Protocol Version 1.0 © 1999 The Internet Society. (80 pages) http://www.faqs.org/ftp/rfc/pdf/rfc2246.txt.pdf.*

(Continued)

*Primary Examiner* — Darren B Schwartz
*Assistant Examiner* — Thomas Gyorfi

(57) ABSTRACT

Used in a communication involving Entity 1 and Entity 2 to authenticate Entity 1's identity, a digital identification of Entity 1 comprises an encrypted character string wherein the string is related to Entity 2 and is directly or indirectly encrypted with a key in a private/public key pair of Entity 1's. Such digital identification is dynamic and can be used as one-time or multiple-time identification. Such digital identification of an entity allows for the entity's being authenticated by another entity without the two entities having a one-to-one communication in advance. Also such a digital identification does not rely on the syntax of other messages or data as does a digital signature do and can be verified easily. The verification of such a digital identification can be easily confirmed by both human beings and machines.

20 Claims, 7 Drawing Sheets

(56) References Cited

OTHER PUBLICATIONS

"Ourshop.com Straightforward Explanation of SSL and HTTPS" Published Dec. 7, 2003 as verified by the Internet Archive (3 pages) http://web.archive.org/web/20031207104735/http://www.ourshop.com/resources/ssl.html.*

Schneier, Bruce. "Applied Cryptography, $2^{nd}$ Edition" © 1996 Bruce Schneier. Published by John Wiley and Sons Inc. (pp. 31-74).*
Ramsdell, editor, S/MIME version 3.1 Message Specification (RFC 3851), www.ietf.org/rfc/rfc3851.txt, Jul. 2004.
Callas, et al., RFC 2440, Open PGP Message Format, www.ietf.org/rfc/rfc2440.txt, Nov. 1998.

* cited by examiner

METHOD AND SYSTEM FOR IDENTITY AUTHENTICATION

CROSS-REFERENCE TO RELATED APPLICATION

This application claims the benefit of Provisional Patent Application Ser. No. 60/583,978 Filed 2004 Jun. 30 by the present inventor.

FIELD OF THE INVENTION

This invention relates generally to digital identifications and methods and systems for identity authentication. Specifically, this invention relates to a new type of digital identification that can be verified easily and used as one-time or multiple-time identification and to a method and system which uses the new type of digital identification to authenticate identities.

BACKGROUND OF THE INVENTION

In non-face-to-face communications, such as e-mail communication, Internet browsing and telephone communication, it is important to be able to assure the identities of all or some of the entities involved in the communications. For example, in e-mail communication, it is important to be able to assure that e-mail goes to its intended recipient and that the sender is the entity that it claims to be. Also, in Internet browsing, it is important that the webpage is from the intended website. In the so called "phishing" attacks, an e-mail sender (phisher) uses other entities' identities to send e-mail to other people. For instance, a "phisher" could send an e-mail which is claimed to be from a bank to a recipient asking the recipient to login to a bogus website and give out sensitive information. The sensitive information is then collected by the "phisher". In the so called "pharming" attacks, people are deceitfully directed to bogus websites. Using the same scheme, a "pharmer" can direct a wireless phone call to a bogus destination. Currently, there are no effective solutions for solving these problems. A method that can effectively perform identity authentication can help to fight against the problems.

Digital signature is a method for identity authentication. In this method, a hash function is used to produce a message digest of a message. Then the message digest is encrypted with the private key in a private/public key pair of the sender of the message. The encrypted message digest then is sent to the receiver of the message. The receiver uses the same hash function to produce a message digest of the message she has received. The receiver also decrypts the encrypted message digest she has gotten from the sender by using the public key in the key pair. Then the receiver tries to see if the decrypted encrypted message digest matches the message digest she has produced with the hash function. If they match, the receiver is assured of the identity of the sender. She is also assured the integrity of the message. Also, the sender of the message cannot deny that she has sent this message to the receiver. Theoretically, the digital signature method can be used to authenticate the sender of data and ascertain the integrity of the data. However, in reality, the effectiveness of this method is affected by many factors and it is not easy to verify a digital signature. First, the hash function used in a digital signature method requires that the data bit stream that is being sent be completely same as the data bit stream that is received in order for the digital signature method to work. Some e-mail systems may add symbols, including whitespaces to e-mail, which invalidates the digital signature. Secondly, a digital signature verifies only the syntax of data but not the semantics of the data. Because different systems could interpret a symbol differently, the data bit streams at the sending end and receiving end could have same syntax but different semantics. That means even when the data bit streams at the sending end and the receiving end are same, the presentations of the bit streams at the sending end and at the receiving end could be different, which means the meanings of the data at the sending end and receiving end could be different. For example, a piece of HTML code could be presented as different Web pages with different meanings by different Web browsers. In this case, the digital signature method is invalidated. S/MIME (Secure/Multipurpose Internet Mail Extensions), Open PGP and PGP/MIME are protocols and systems for sending and receiving signed and encrypted e-mail. In these systems, digital signatures are used to sign e-mail, therefore the systems inherit the problems with the digital signature method discussed above. Since a digital signature carries a serious authority, the use of this method in an open environment, such as the Internet with variety of browsers and mail systems, could be very misleading and causes adverse consequences.

OBJECTS OF THE INVENTION

It is an object of this invention to obviate the disadvantages of the prior art; It is an object of this invention to create digital identifications that can be effectively and easily verified by both human beings and machines, that are conditionally valid for an entity and therefore cannot be misused for unintended purposes; It is an object of this invention to use the digital identifications to provide an identity authentication method that can be effectively used in both a closed environment, such as an Automatic Teller Machine and a private network, and an open environment such as the Internet; It is an object of this invention to provide a solution to fight against the so called "phishing", "pharming" and "man-in-the-middle" attacks. The digital identification authenticates the identity of the sender of a message. The features of the digital identification, such as one-time-use and relevance to the message, and other factors, such as network communication robustness, ensure the integrity of the message. For example, when the method of this invention is used to authenticate the identity of the destination of a wireless phone call connection, the robustness of the signal transmission, and human judgment ensure that no other messages from other sources are inserted in the phone conversation without being noticed.

Further objects and advantages of this invention will become apparent from a consideration of the drawings and ensuing description.

SUMMARY OF THE INVENTION

In accordance with present invention a digital identification of a first entity comprises an encrypted character string wherein said character string is related to a second entity and is encrypted directly or indirectly with a key in a private/public key pair of the first entity's. Different segments of the character string can be delimitated by characters such as "", ";" and ".". In an embodiment of this invention, a digital identification of Entity 1 is created by Entity 1's encrypting a character string that comprises Entity 2's e-mail address, a date/time stamp and a numerical identifier using Entity 1's private key in a private/public key pair. An example of the character string looks like this: entity2@itsmail.com,01/01/1999 10:31 am,2. In this example, a comma is used to delimitate different segments. The digital identification of Entity 1 is valid only when it is used to prove Entity 1's identity to Entity 2, and usually is valid for one-time-use only, therefore it is hard to misuse the digital identification for other purposes. Such a digital identification of an entity is referred to as a dynamic digital identification of the entity in the Specification and Drawings of this invention. Also in accordance with present invention a method of identity authentication using dynamic digital identifications comprises the following:

a) Entity 1 and Entity 2's sharing the content or part of the content of a character string which is used to create a dynamic digital identification of Entity 1 for using with Entity 2;

b) Creating Entity 1's dynamic digital identification using said string;

c) Communicating the dynamic digital identification of Entity 1 to Entity 2;

d) Entity 2' or its representative's decrypting said dynamic digital identification;

e) Entity 2' or its representative's checking if the decrypted dynamic digital identification matches the expected result. If it matches, Entity 1's identity is authenticated.

In the above embodiment of present invention, the string or part of said string does not need to be secret therefore there is no need of a one to one communication between Entity 1 and Entity 2 in order to share the knowledge about the content of the string between the two entities. The digital identification of Entity 1 is valid only when used to prove Entity 1's identity to Entity 2 and is usually for one-time-use, therefore the possibility of such an identification being effectively misused is low. Another embodiment of this invention presents a method of identity authentication involving Entity 1 and Entity 2. Entity 2 creates a dynamic digital identification of Entity 1 by encrypting a string that includes Entity 2's IP address and a randomly generated segment with Entity 1's public key in a private/public key pair; Entity 2 communicates the dynamic digital identification to Entity 1; Entity 1 then decrypts the digital identification with its private key in the key pair and sends the result to Entity 2 through a secured communication channel; Then Entity 2 checks if the returned result meets the expectation; If it does, Entity 1's identity is authenticated.

In the present invention, the verification of the digital identification can be easily confirmed by both human beings and machines. The present invention provides a solution to fight against the so called "phishing" attacks, "pharming" attacks and "man-in-the-middle" attacks.

DETAILED DESCRIPTION OF THE INVENTION

Figure 1:
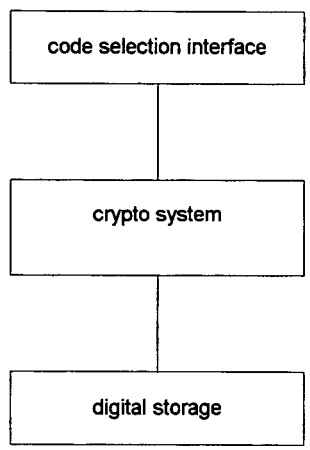
FIG. 1 is a block diagram showing a dynamic digital identification creation system.

A dynamic digital identification of Entity 1 comprises an encrypted character string wherein the string is related to Entity 2, the entity with whom Entity 1 is communicating, and is encrypted directly or indirectly with a key in a private/public key pair of Entity 1's. For example, if character string "236.234.5678" is Entity 2's IP address, then a dynamic digital identification of Entity 1 used when communicating with Entity 2 can be created by encrypting string "236.234.5678" with the private key in a private/public key pair of Entity 1's. FIG. 1 is a block diagram showing a dynamic digital identification creation system. A character string selection interface could be a graphic user interface or a text based user interface that runs on an electronic device such as a computer. Such an interface could be used to create dynamic digital identifications for an entity, Entity 1, to prove its identity to another entity, Entity 2. Through the user interface, strings are selected or constructed for creating dynamic digital identifications. The user interface could do so by either specifying a string or using a scheme to derive a string for Entity 2. An example of such a scheme is to use the e-mail address of an entity with whom Entity 1 is communicating as the string, C. String C is usually related to Entity 2 and made known to Entity 2. The interface could also be used to select other factors that could make the string more dynamic. For example, a date/timestamp could be included in string C. A numerical message number could also be included in String C. Also, a factor that is dynamically related to the context where a dynamic digital identification is used, such as the number of characters of the first sentence of an e-mail message and the subject title of an e-mail message, could be included in String C. After string C is constructed, an asymmetric crypto system, such as the RSA public key system is used to encrypt C. Through the crypto system, a private/public key pair, (Pk, P) is generated. The public key is published by Entity 1 or a third party through a communication medium, such as the Internet. Entity 1 or a third party encrypts string C with its private key Pk and gets Epk(C), where E is the encryption algorithm and Pk is the private key. Consequently, a dynamic digital identification of Entity 1, DDI(C) is created. Then the dynamic digital identification could be used to prove Entity 1's identity to Entity 2 and it is valid only when used with Entity 2. Also String C can be first encrypted by a symmetric encryption algorithm using a secret key, sk. The secret key, sk, is then encrypted by the asymmetric encryption algorithm, E, using the private key, Pk. Consequently, we get Epk(sk) which can be used to get sk through the public key, P, and to get string C through decryption using the secret key, sk. If the character string resulted from the decryption matches with the expected character string, Entity 1's identity is authenticated. In an earlier example, Entity 2's IP address "234.236.5678" is used to create the dynamic digital identification of Entity 1. Therefore if the character string resulted from the decryption matches Entity 2's IP address "234.236.5678", Entity 1's identity is authenticated. As illustrated by the above example, the dynamic digital identification of this invention allows for identity authentication based on the semantics, i.e. the meaning, of a string, which is more reliable than the methods that is based on the syntax of a string or data. A dynamic digital identification could be a one-time identification and could be stored in a persistent or non-persistent storage. It could also be encrypted before it is communicated to Entity 2.

Figure 2:
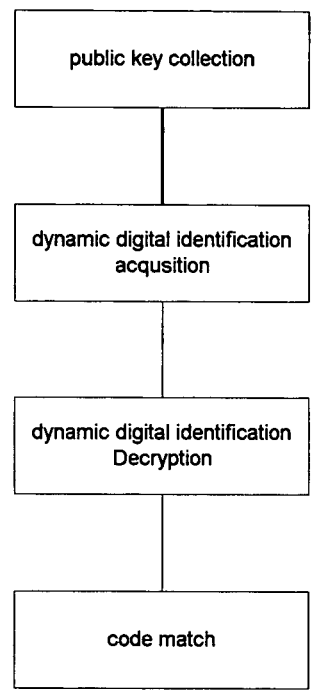
FIG. 2 shows a block diagram of an identification match system (IMS) which uses the public key to decrypt a dynamic digital identification and checks if the result meets the expectations.

FIG. 2 shows a block diagram of an identification match system (IMS). Entity 1 or its representative communicates a dynamic digital identification, DDI(C), of Entity 1 to Entity 2 or its representative. The public key collection component for Entity 2 gets the public key P of Entity 1 through Entity 1 or a third party. The IMS acquires DDI(C) and decrypts it through the crypto system and gets Dp(DDI(C)), where D is the decryption algorithm, and P is the public key. If string C was encrypted by a secret key, sk, and sk was encrypted with the private key Pk, then the public key, P, is used to decrypt the encrypted sk and get sk, and sk is used to get string C. A code matching component checks if string C matches the expected result. If it matches, then Entity 1's identity is authenticated. Otherwise Entity 1's identity is considered unascertain. In particular, if String C contains a numerical message number identifier, the numerical message number could be recorded and checked. If it is identical with a previous message number of Entity 1, Entity 2 could be alerted that the DDI(C) has been used more than once. By using a different message identifier, e.g. a message number, for each communication between Entity 1 and Entity 2, the dynamic digital identifications become one-time-use identifications.

Figure 3:
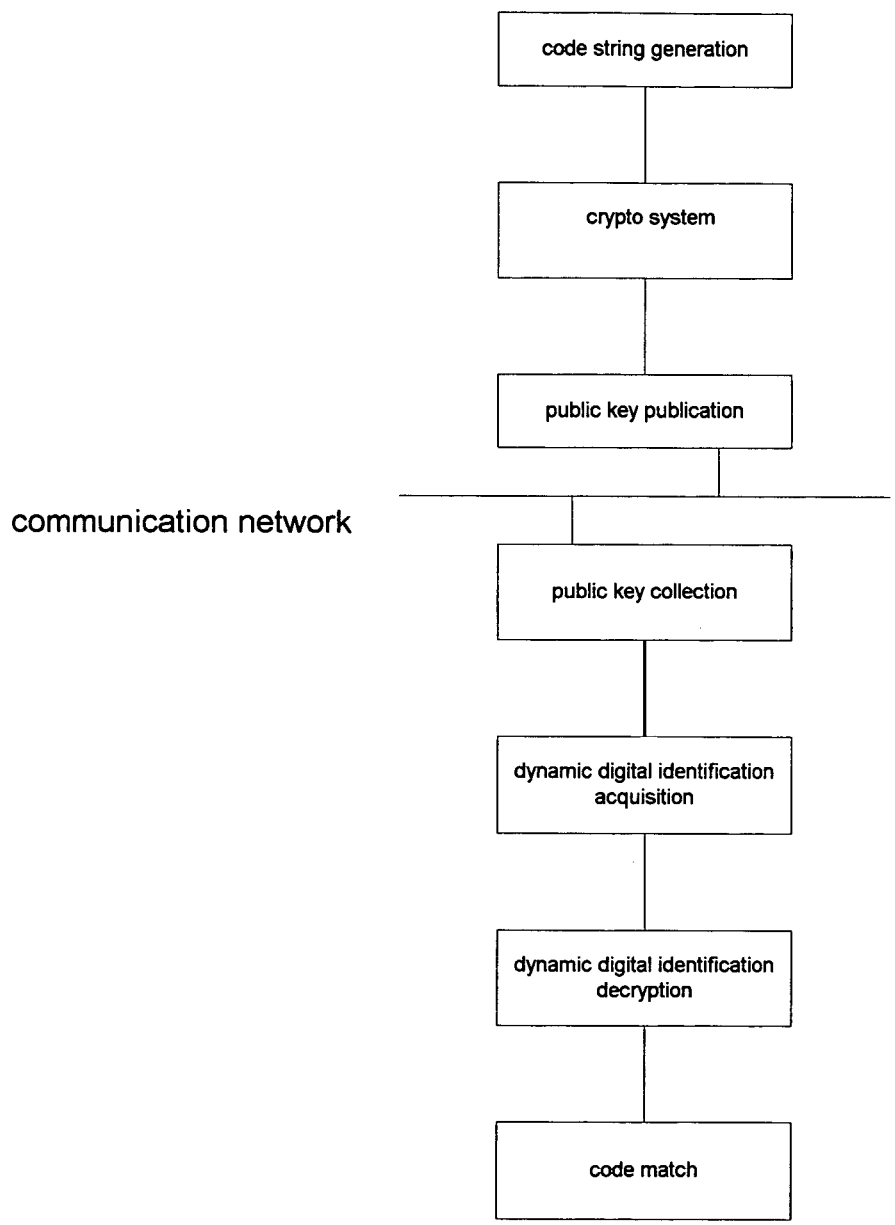
FIG. 3 shows an embodiment of the method of authentication, identification and/or verification through dynamic digital identifications.

FIG. 3 shows an embodiment of the method of authentication, identification and/or verification through dynamic digital identifications. In this embodiment, Entity 1 tries to prove its identity to Entity 2. Entity 1 or a third party who represents Entity 1 publishes its public key P, and uses the private key Pk to create dynamic digital identifications. Entity 1 or a third party creates Entity 1's dynamic digital identification for use in a communication with Entity 2 by first specifying or creating a string, C, which is made known to Entity 2. C is usually relevant or unique to Entity 2. Entity 1 or the third party then encrypts C using the private key Pk and gets Epk (C), where E is the encryption algorithm. Then a dynamic digital identification of Entity 1, DDI(C), is created. String C can also be first encrypted by a symmetric encryption algorithm using a secret key, sk and Pk is then used to encrypt sk. When Entity 1 communicates with Entity 2, a DDI(C) is communicated to Entity 2 directly or through third parties. If a secret key, sk, is used, the encrypted sk is also communicated to Entity 2 or the third parties. Entity 2's identification match system (IMS) acquires the DDI(C) and the encrypted sk if any. The IMS gets the public key P through a Public Key Infrastructure or directly from Entity 1 and uses it to decrypt the encrypted string C or the encrypted secret key sk and uses sk to decrypt the encrypted string C. If the character string resulted from the decryption matches the expected character string, then Entity 1's identity is authenticated.

Figure 4:
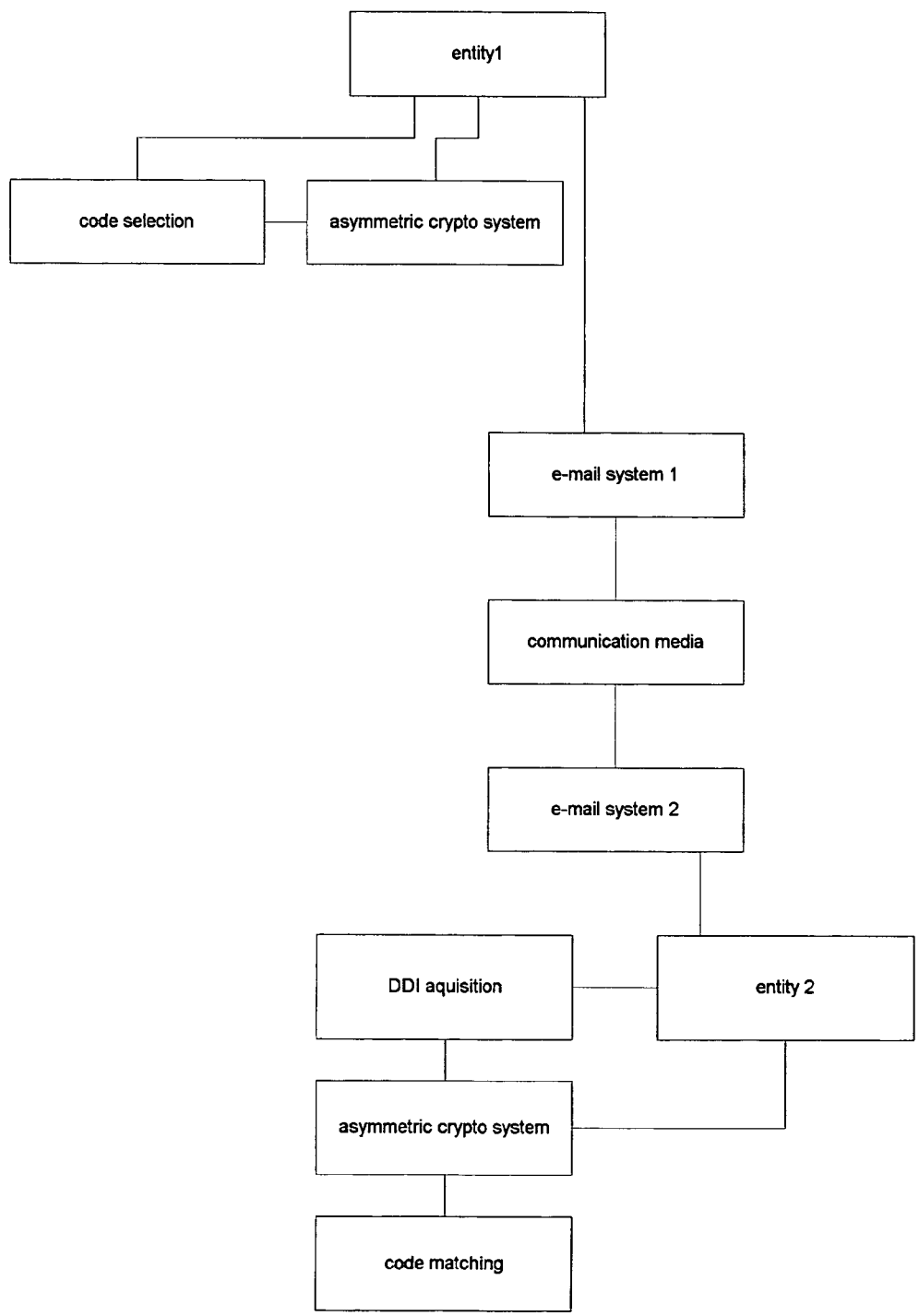
FIG. 4 is a block diagram of an identity verification system for e-mail communications between entity 1 and entity 2.

FIG. 4 is a block diagram of an identity verification system for e-mail communications between Entity 1 and Entity 2. When sending an e-mail to Entity 2, Entity 1 uses a dynamic digital identification creation system to generate a DDI(A), where A is a character string that includes Entity 2's e-mail address, a numerical message number, the subject title of the e-mail, a number that shows the number of characters of the first sentence of the message and a date/timestamp. Then the DDI(A) is included as part of the e-mail that is to be sent to Entity 2. For example, a DDI(A) can be part of sender's identification in the email. Then DDI(A) is sent to Entity 2 through an e-mail system. A secured communication link may be used. Also, string A can be encrypted by a symmetric encryption algorithm using a secret key, sk. In this case, the asymmetric algorithm is used to encrypt the secret key, sk, using the private key, Pk. Entity 2 receives the e-mail through its e-mail system. Then Entity 2's Identification Match System (IMS) acquires the dynamic digital identification, i.e. DDI(A) and the encrypted sk if any. If the private key, Pk, is used to encrypt string A directly, then the public key, P, is used to decrypt the encrypted string A. If key Pk is used to encrypt a secret key, sk, which is used to encrypt string A, then key P is used to decrypt the encrypted key sk and sk is used to decrypt the encrypted string A. If the result matches the expected result, then Entity 1's identity is authenticated. For example, if the RSA public key crypto method is used, when the decryption results in a character string that includes Entity 2's e-mail address, a message number that has not been previously used during a specified time frame, the subject title, the number that shows the number of characters the first sentence of the e-mail message has, and a reasonable date/timestamp, Entity 1's identity is authenticated. A reasonable date/timestamp could be a date/timestamp that matches the date/timestamp when the e-mail was sent. Also, the time when the E-mail was received could be used to determine if the time stamp is correct.

Figure 5:
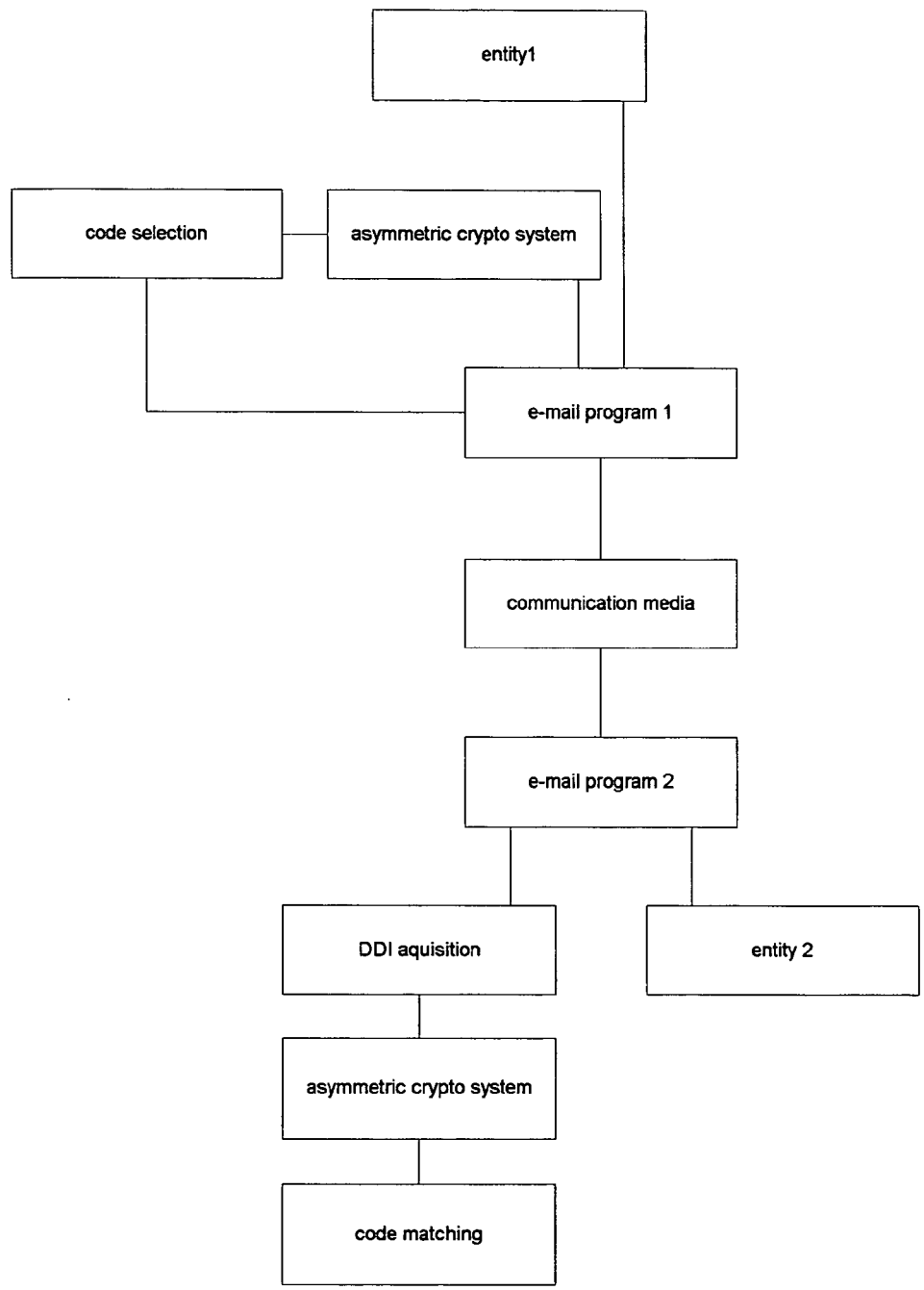
FIG. 5 is a block diagram showing an identity verification system for e-mail communications. In this system, a dynamic digital identification creation system and an Identification Match System (IMS) are embedded in the e-mail systems (e-mail server and/or e-mail client systems) used by entity 1 and entity 2.

FIG. 5 is a block diagram showing another identity verification system for e-mail communications. In this system, a dynamic digital identification creation system and an Identification Match System (IMS) are embedded in the e-mail systems (e-mail server and/or e-mail client systems) used by Entity 1 and Entity 2. The RSA public key method is used. When Entity 1 tries to send e-mail to Entity 2, Entity 1's e-mail system creates a dynamic digital identification, DDI (A), for Entity 1, where A is a character string that includes Entity 2's e-mail address, a numerical message number, a date and timestamp and the subject title of the e-mail. Then DDI(A) is included as part of the e-mail sent to Entity 2. A secured communication link may be used. The Identification Match System in Entity 2's e-mail system automatically acquires the digital identification and decrypts it to see if the string is the same as expected. If so, the e-mail system interface will show the e-mail as authenticated. Otherwise, the interface could show the e-mail as unascertain or not show the e-mail at all.

Figure 6:
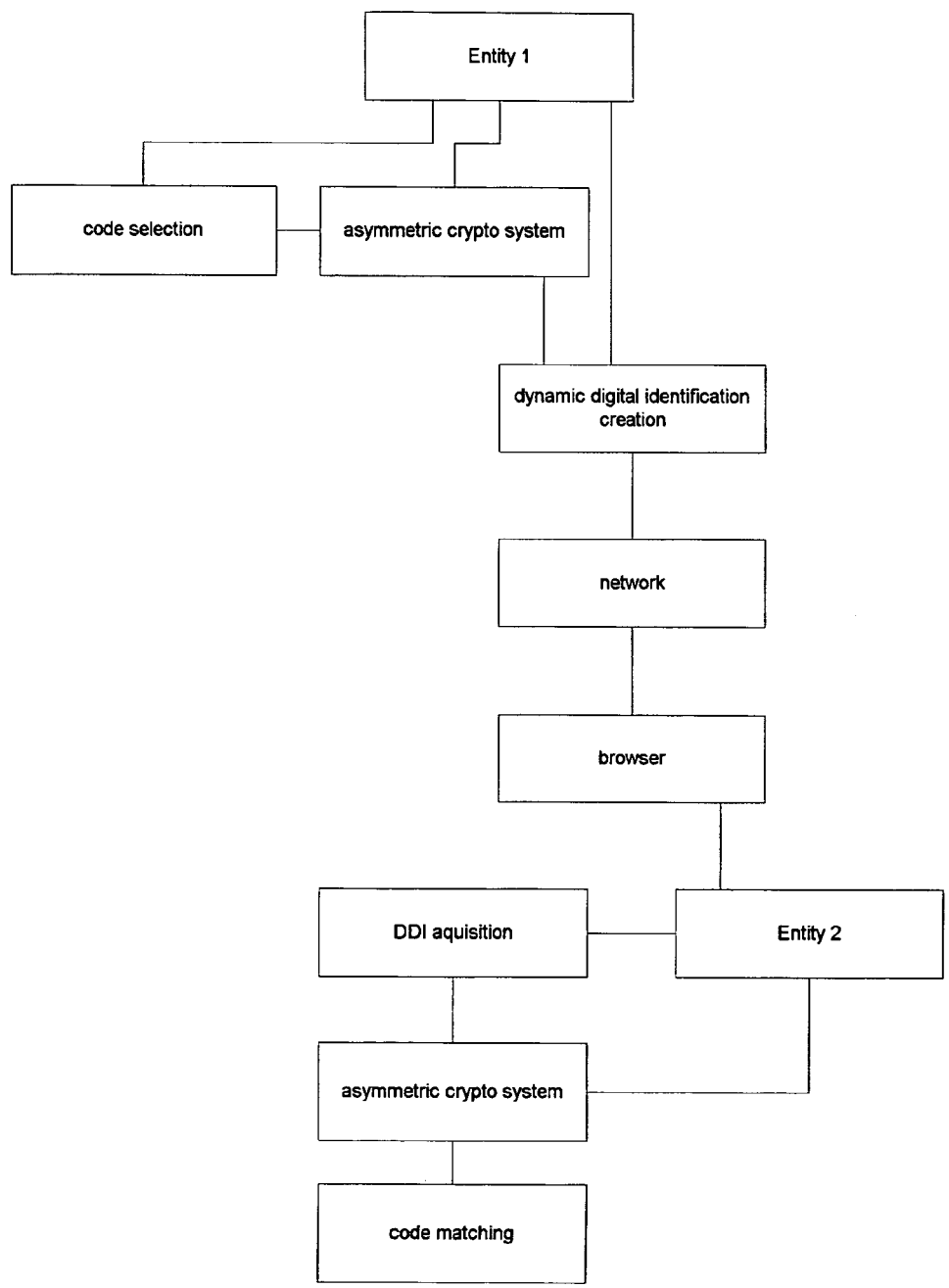
FIG. 6 shows an embodiment of the authentication method in which a dynamic digital identification is used to authenticate the identity of a digital certificate issued by Entity 1.

FIG. 6 shows another embodiment of the authentication method. In this embodiment, a dynamic digital identification is used to authenticate the identity of a digital certificate issued by Entity 1. The RSA public key crypto algorithm is used. A character string that includes Entity 2's IP address, a date/time stamp and a numerical message number is used to create the dynamic digital identifications of Entity 1. When Entity 2 clicks a digital certificate link (could be a graphical link), the dynamic digital identification (DDI) creation system for Entity 1 creates a DDI by using the return IP address included in the network request as Entity 2's IP address. Then Entity 1 delivers the DDI together with other requested information to the IP address. A secured communication link may be used. After receiving the content from Entity 1, Entity 2 requests its Identification Match System (IMS) to verify if Entity 1 is the authentic issuer. The IMS of Entity 2 acquires the DDI through the user, e.g. through the user's copying and pasting the DDI to IMS, and decrypts the DDI with Entity public key. Then the IMS checks if the decrypted DDI matches a character string that includes Entity 2's IP address, a date/timestamp indicating when the request was made and a numerical message number. It also checks and makes sure that the message number has not been previously used within a specified time frame. If all the conditions are met, the identity of the issuer of the digital certificate is authenticated. This method can also be used to authenticate the identity of a website, a digital logo, pop-up windows, etc. This embodiment also shows that the identity authentication method using the dynamic digital identification of this invention can be used to fight against the so called "man-in-the-middle" problem. When Entity 3 tries to act between Entity 1 and Entity 2, the dynamic digital identification that Entity 1 sends to Entity 3 would be created with Entity 3's IP address, Entity 2 would notice the problem when conducting identification match.

Figure 7:
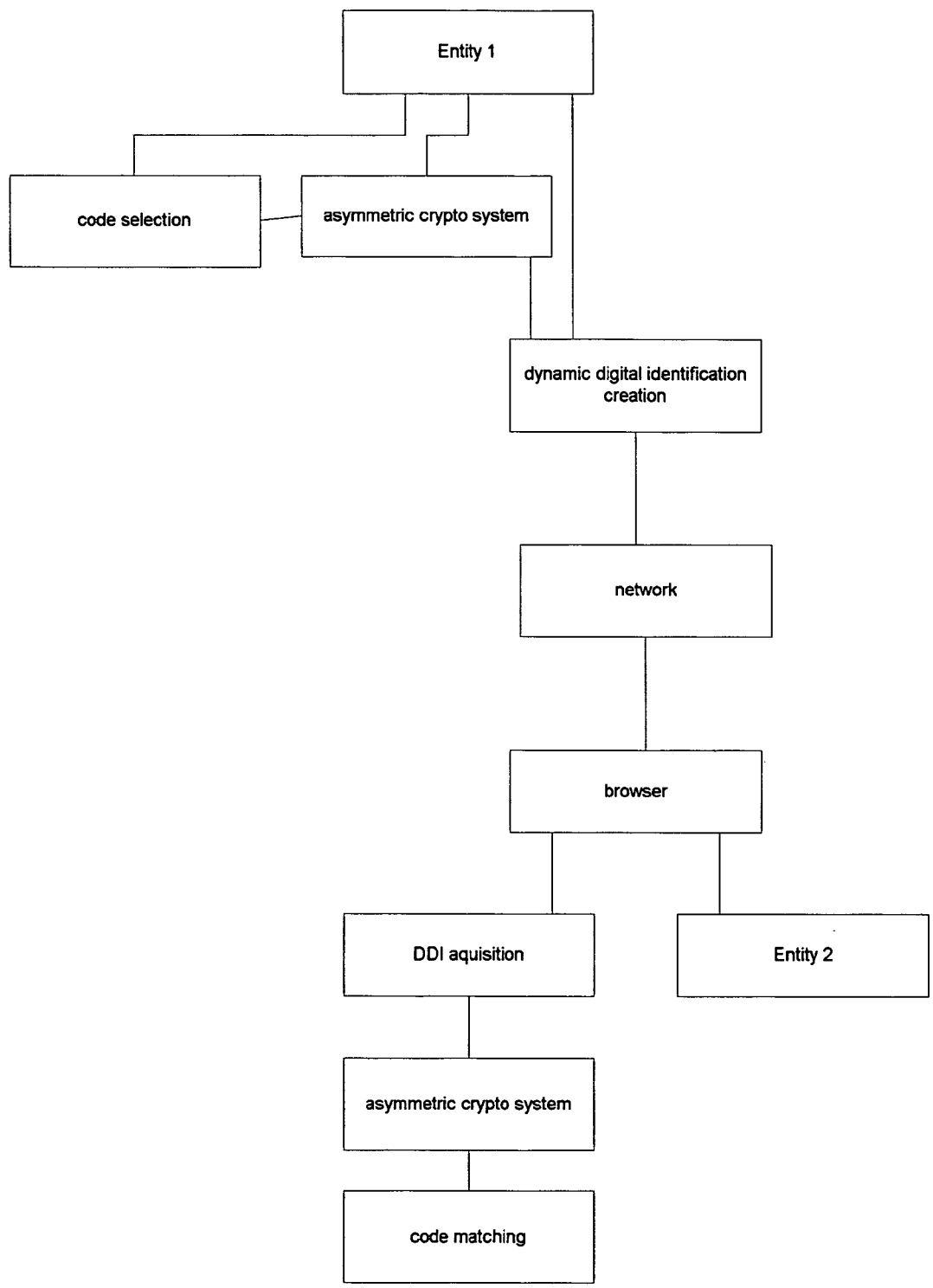
FIG. 7 shows an embodiment of using DDI to authenticate digital certificates. In this embodiment, Entity 2 tries to authenticate the identity of a digital certificate issued by Entity 1 and the IMS for Entity 2 is embedded in the browser.

FIG. 7 shows another embodiment of using DDI to authenticate digital certificates. In this embodiment, Entity 2 tries to authenticate the identity of a digital certificate issued by Entity 1 and the IMS for Entity 2 is embedded in the browser. A character string that includes Entity 2's IP address, a date/time stamp and a numerical message number is used to create the dynamic digital identifications of Entity 1. When Entity 2 clicks a digital certificate link (could be a graphical link), the dynamic digital identification (DDI) creation system for Entity 1 creates a DDI by using the return IP address included in the network request as Entity 2's IP address. Then Entity 1 delivers the DDI together with other requested information to the IP address. The IMS for Entity 2 acquires the DDI automatically and decrypts the DDI with Entity 1's public key. Then the IMS checks if the decrypted DDI matches a character string that includes Entity 2's IP address, a date/timestamp indicating when the request was made and a numerical message number. It also checks and makes sure that the message number has not been previously used within a specified time frame. If all the conditions are met, the identity of the issuer of the digital certificate is authenticated. Otherwise, the authenticity of the digital certificate is not assured. Another variant of this embodiment is shown by the following example. When entity EN is about to visit website W, entity EN or its representative, such as a browser, can create a DDI for website W by using website W's public key and a character string S which includes entity EN's IP address, a message number, a date/time stamp and a string segment that is unknown to website W. Entity EN or its representative first encrypts string S and gets DDI(S) and then communicates DDI(S) to website W. Website W decrypts DDI(S) using its private key and gets D(DDI(S)). Then website W sends D(DDI(S)) along with the requested web page to the IP address it gets from D(DDI(S)), which should be entity EN's IP address. At entity EN, D(DDI(S)) is checked to see if it matches the original string S based on pre-defined rules. If it does match string S, then website W's identity is assured. A secured communication link is used when communicating D(DDI(S)) between different entities. The above embodiments also show how this invention can be used to authenticate the identity of a digital logo, a pop-up window, etc.

Another embodiment of this invention is an access control system that allows an Automatic Teller Machine (ATM) user to verify that the ATM is legitimate. In this embodiment, an ATM user, Entity 1, tries to verify the identity of the ATM, Entity 2, while trying to gain access to Entity 2. An asymmetric crypto method is used. Entity 1 has a public key of Entity 2, P, and Entity 2 has the private key, Pk. Entity 1 and Entity 2 mutually agree that Entity 1's user ID is used to create dynamic digital identifications of Entity 2 for using with Entity 1. In the authentication process, Entity 1 first contacts Entity 2 with its user ID. Then Entity 2 generates a string, M, which includes the user ID and a date/time stamp. Entity 2 then encrypts M with its private key Pk and gets Epk(M), where E is the encryption algorithm. Then Entity 2 communicates Epk(M) to Entity 1. Entity 1 decrypts Epk(M) with Entity 2's public key P and get Dp(EpkM)), where D is the decryption algorithm. Entity 1 checks if Dp(Ekp(M)) matches the expected result. If it matches, then Entity 2 is authenticated.

For all the above embodiments of this invention, electronic devices, such as computers, PDAs and smart cards could be used to create and store the keys and perform the encryptions and decryptions.

The above description shows that the digital identification of this invention can be easily and reliably verified and its verification can be easily confirmed by human beings. The description also shows the identity authentication method using the digital identification of this invention is an effective solution for fighting against "phishing", "pharming" and "man-in-the-middle" attacks.

While several embodiments of the invention have been shown and described herein, it will be obvious to those skilled in the art that various changes and modifications can be made therein without departing from the scope of the invention as defined by the Claims.

I claim:

1. In a multi-entity network environment, a method for creating a first entity's digital identification dynamically for a second entity to authenticate said first entity, comprising:
disclosing a public key of said first entity; receiving an electronic network request from a device of said second entity by a device of said first entity; acquiring the network address of said second entity by a device of said first entity; based on the acquired network address, determining the content of a character string comprising information related to said second entity; creating a digital identification of said first entity by processing said string using a private key, said private key being the private key in a private and public key pair of said first entity's where the public key being the disclosed public key; transmitting a response comprising the dynamically created digital identification to said network address;
whereby said digital identification of said first entity is dynamically created for said second entity using said second entity's information and is valid only when used by said second entity.

2. The method as recited in claim 1, wherein said content of said character string comprises said network address of said second entity.

3. The method as recited in claim 2, wherein said network address is an IP address.

4. The method as recited in claim 2, wherein said content of said character string comprises a date/time stamp indicating when said request was made.

5. The method as recited in claim 4, wherein said content of said character string comprises a message number.

6. The method as recited in claim 2, wherein said response comprises a digital certificate issued by said first entity.

7. The method as recited in claim 2,
wherein processing said string using a private key of said first entity's comprising:
a) encrypting said string using a secret key in a symmetric encryption method;
b) encrypting said secret key with the private key, said private key being the private key in a private and public key pair of said first entity's where the public key being the disclosed public key.

8. The method as recited in claim 2 wherein processing said string using a private key of said first entity's comprising:
encrypting said string with the private key using an asymmetric encryption method, said private key being the private key in a private and public key pair of said first entity's where the public key being the disclosed public key.

9. The method as recited in claim 8 wherein said asymmetric encryption method is a RSA public key crypto algorithm.

10. The method as recited in claim 2 wherein transmitting a response to said network address is conducted through a secured link.

11. The method as recited in claim 1, wherein said content of said character string comprises said second entity's identity information.

12. The method as recited in claim 1, wherein said content of said character string comprises information related to what said first entity communicates to said second entity.

13. The method as recited in claim 1, wherein said content of said character string comprises said first entity's identity information.

14. The method as recited in claim 1, wherein said content of said character string comprises an identifier that identifies said dynamic digital identification.

15. The method as recited in claim 1, wherein said response comprises a webpage.

16. In a multi-entity network environment, a method for authenticating a first entity's identity by a second entity, comprising:

sending an electronic network request by a device of said second entity to a device of said first entity; receiving a response comprising a dynamic digital identification of said first entity at said second entity's network address, said dynamic digital identification being created based on said network address after said network request is received and said network address is acquired by said first entity, by encrypting a character string comprising information related to said second entity using an encryption key of said first entity's; acquiring a public key of said first entity's, said public key being the public key in a public and private key pair; decrypting said dynamic digital identification to produce a result by using said public key of said first entity's; verifying the identity of said first entity by matching said result against the expected content including information related to said second entity, whereby said second entity authenticates said first entity with the dynamic digital identification created dynamically by said first entity for said second entity and the dynamic digital identification is valid only when used by said second entity.

17. The method as recited in claim 16 wherein decrypting said dynamic digital identification is done by a browser program.

18. The method as recited in claim 16 wherein receiving said dynamic digital identification is done through a secured link.

19. The method as recited in claim 16 wherein decrypting said dynamic digital identification is done by an Identification Match System.

20. The method as recited in claim 16, wherein matching said result against the expected content comprises matching an IP address in said result against the IP address where said digital identification was sent to.

* * * * *